(No Model.)

W. I. MANNING.
PLOW.

No. 531,322. Patented Dec. 25, 1894.

Witnesses:
Walter Tamariss
Rose E. Rabbitt.

Inventor:
W. I. Manning.
By John G. Duffie
Attorney.

UNITED STATES PATENT OFFICE.

WILLIAM I. MANNING, OF ROANOKE, ALABAMA.

PLOW.

SPECIFICATION forming part of Letters Patent No. 531,322, dated December 25, 1894.

Application filed March 15, 1894. Serial No. 503,751. (No model.)

*To all whom it may concern:*

Be it known that I, WILLIAM I. MANNING, a citizen of United States, residing at Roanoke, in the county of Randolph and State of Alabama, have invented certain new and useful Improvements in Plows and consists of a grooved plow-handle and metal clip for adjustably securing the handle to the beam; and I do hereby declare the following to be a full, clear, and exact description of the invention, such as will enable others skilled in the art to which it appertains to make and use the same.

Figure 1:
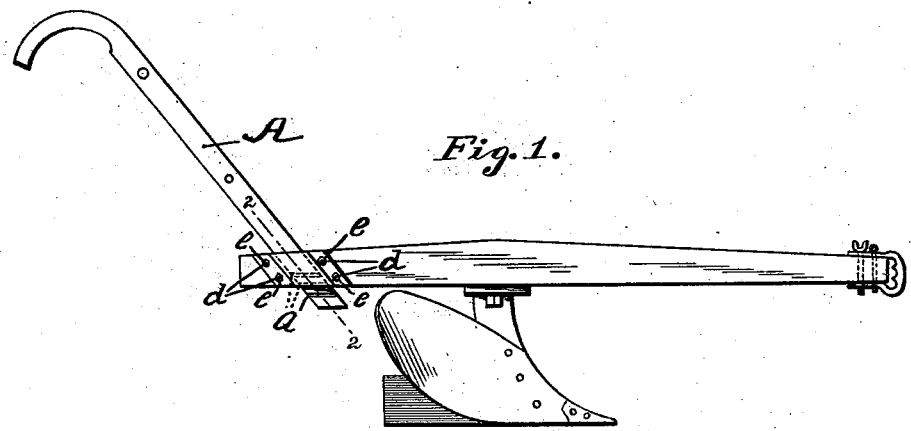
Figure 2:
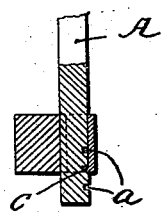
Figure 4:
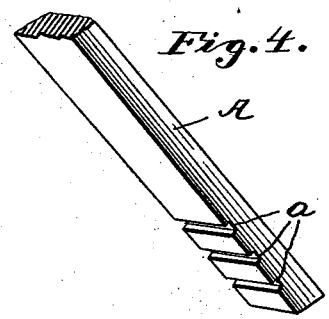
Figure 3:
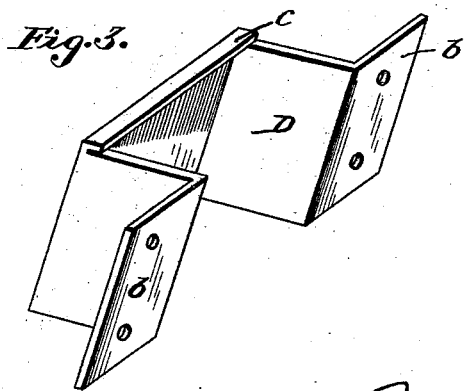

My invention consists of a deep grooved plow handle and a metal clip cut from a single sheet of metal, perforated and bent into proper shape for adjustably securing the handle to the beam and to hold said plow handle steadily in place, that is to keep it from moving laterally or backward or forward and is described as follows:

In the accompanying drawings, Figure 1 is an elevation of a plow with my improvement attached thereto. Figs. 2, 3 and 4 are detail views.

My invention is described as follows:

A, is the plow handle, on the outer face of which are cut parallel grooves $a$, running at such an angle as to throw the handles back to such a position as will be suitable for the plow stock to which they are attached. The walls of these grooves are perpendicular to the face of the handle.

B, is the deep or wide clip provided with perforated deep or wide wings $b$, U part or bow D, and the flange $c$, which turns in at right angles to the face of the clip. Through the beam of the plow are perforations which register with the perforations of the wings $b$, of the clip, and said clip is secured to the beam by means of threaded bolts $d$, passing through said perforations, the threaded ends of said bolts being long enough to allow the nuts $e$, to be turned up sufficiently far to allow the handle A, to be moved up or down through said clip, without screwing the nuts off of the threaded ends of said bolts. The clip performs three functions: It holds the plow handle in place on the beam, and by means of the flange $c$, and the grooves $a$, in the handle it allows the plow handle to be adjusted high or low, and as the clip is very wide it holds the plow handle from moving laterally or forward or backward.

When I wish to insert the plow handle I loosen the nuts $e$, until I can raise the clip sufficiently high and then insert the plow handle, until the flange $c$, of the clip rests in the first, second, or third groove, $a$, as desired. Then the nuts are screwed home again. When I wish to change the height of the plow handles it is done by the same operation.

Having described my invention, what I claim as new, and desire to secure by Letters Patent, is—

In combination with a perforated plow beam, the handle A, provided with the parallel grooves $a$, and the deep clip B, provided with the perforated wings $b$, and flange $c$, at right angles to the face of the clip and adapted to fit in the grooves $a$; said clip adapted to be secured to the plow beam by bolts and nuts, substantially as shown and described and for the purposes set forth.

In testimony whereof I affix my signature in presence of two witnesses.

WILLIAM I. MANNING.

Witnesses:
J. T. NELSON,
J. W. STEPHENSON.